Oct. 12, 1948.  E. RAWSON  2,451,456
STALL COCK
Filed July 20, 1945
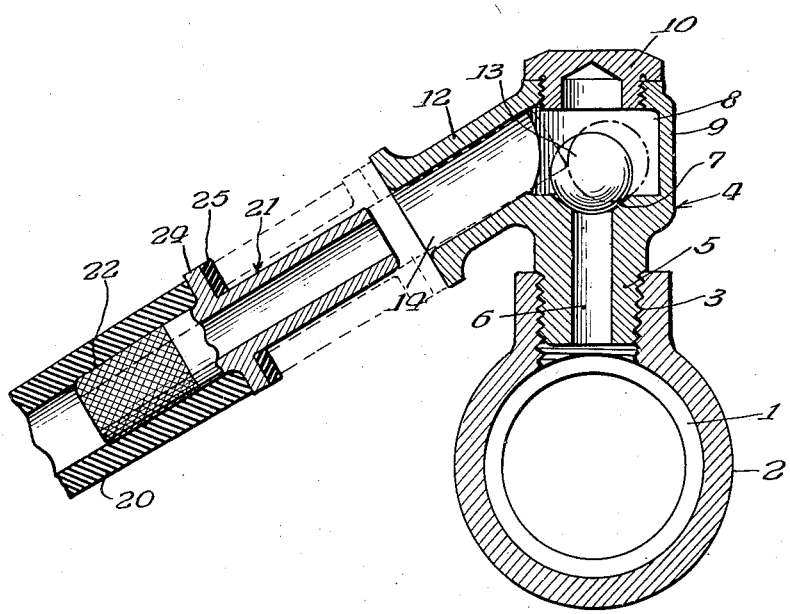
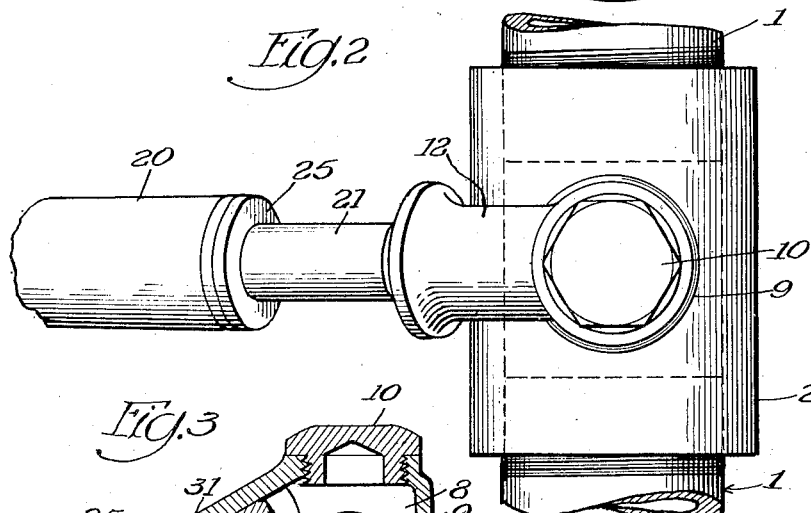
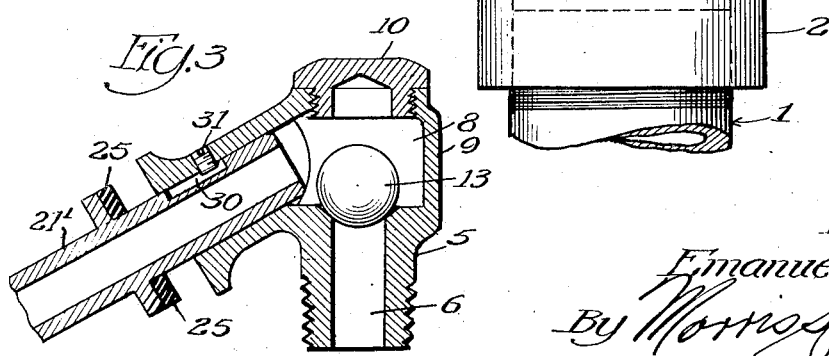
Inventor
Emanuel Rawson
By Morris Spector, Atty Patented Oct. 12, 1948

2,451,456

UNITED STATES PATENT OFFICE 2,451,456

STALL COCK

Emanuel Rawson, Chicago, Ill., assignor to Rite-Way Products Company, Chicago, Ill., a corporation of Delaware Application July 20, 1945, Serial No. 606,162

13 Claims. (Cl. 284—18)

This invention relates to stall cocks used on vacuum lines which extend through a dairy barn for the attachment of flexible pipe branches of individual movable vacuum operated milking machines.

It is one of the objects of the present invention to provide a stall cock which is normally closed and which is adapted to be opened by the simple act of plugging in the portable hose of a milking machine unit.

It is a further object of the present invention to provide a stall cock of the above mentioned character wherein the portable hose of the milking machine unit may be simply plugged in or pulled out of the cock to establish or interrupt the vacuum connection to the milking machine unit, and wherein while the atmospheric pressure may be effective to help hold the plugged hose in position, the hose will nevertheless remain substantially in position even if there is a loss of the vacuum of the line and establishment of atmospheric pressure in the vacuum line.

It is a still further object of the present invention to provide an automatic stall cock of the above mentioned character wherein the closure is obtained by a simple ball which is biased, preferably by gravity, to a closed position on a valve seat and maintained in that position by gravity.

The attainment of the above and further objects of the present invention will be apparent from the following specification taken in conjunction with the accompanying drawing forming a part thereof.

In the drawing:

Figure 1 is a longitudinal sectional view of a device embodying the present invention;

Figure 2 is a top view of the device; and

Figure 3 is a section corresponding to Figure 1 and illustrating a modified construction.

In the accompanying drawing like reference numerals designate like parts throughout.

In Figures 1 and 2 there is shown at 1—1 a vacuum pipe line which is permanently installed in a dairy barn and extends from stall to stall. At those stalls where a stall cock is to be provided a pipe T 2 is inserted in the line 1, said T having an upwardly extending threaded opening 3 for receiving a cast metal stall cock fitting 4 which has a tubular externally threaded lower end 5 that threads into the opening 3. A bore or port 6 of the fitting terminates in a conical valve seat 7 which opens into a chamber 8 in the head 9 of the fitting. The top of the head is closed by a screw plug 10 which forms an air tight seat on the top of the head portion. A straight tubular branch 12 extends from the head portion 9 at an angle downwardly.

A ball 13 rests on the conical valve seat 7 and closes the port or bore 6. The fitting 4 and the ball 13 are preferably non-corrosive metal such as, for instance, bronze. If desired, and this is optional, a rubber or other yielding valve seat may be provided at 7 or, alternately, the ball 13 may be made of rubber. This will provide rubber to metal or metal to rubber contacting surfaces at the valve.

The ball 13 is of a diameter greater than the diameter of the bore 14 in the tubular branch 12. Therefore the ball can never fall out of the fitting through the tubular branch 12. The ball 13 is of a diameter less than the diameter of the top opening in the head 9.

When the fitting is installed in the vacuum line in the manner illustrated in Figures 1 and 2 the ball 13 is gravity biased to its closed position. The interior chamber 8 is open to atmosphere via the bore 14 so that when there is a vacuum on the line 1 the ball 13 is pressed toward the seat by the preponderance of the atmospheric pressure on the side of the ball opposite the portion thereof that is exposed to the vacuum.

At 20 I have shown the end of a rubber hose the opposite end of which is connected to a portable vacuum operated pulsating type milking machine unit. The end of the hose 20 has a connector tube 21 inserted thereinto. The connector tube 21 slightly stretches the end of the rubber hose 20 so that the rubber hose firmly grips the outside of the connector tube. To facilitate the gripping action of the rubber hose on the end of the connector the outer surface of the connector at the lower end thereof is knurled or roughened, as indicated at 22.

The connector tube 21 has a peripheral flange 24 intermediate the ends of the tube. A yieldable gasket 25, of rubber or the like, surrounds the tube 21 on one side of the flange 24. The external diameter of the connector tube 21 above the flange 24 is of a diameter slightly less than the internal diameter of the bore 14. When it is desired to establish vacuum connections between the hose 20 and the vacuum line 1 the end of the connector tube 21 is manually inserted into the bore 14. The upper end of the connector tube 21 engages and pushes the ball 13 to the right, as indicated by dotted lines in Figure 1, thereby unseating the ball 13 from its seat 7 and establishing vacuum connections from the bore 6 to the interior of the connector tube 21. At the same time the rubber gasket 25 engages the lower end of the tubular portion 12 and makes an air-tight fit around it. The preponderance of atmospheric pressure over the air pressure of the vacuum line 1 presses the flange of the connector tube 21 towards the lower end of the tubular portion 12, thus maintaining the connector tube in position within the fitting.

When it is desired to disconnect the hose 20 from the vacuum line it is merely necessary to pull on the hose. This causes the hose to retract the connector tube 21 from the fitting. As the upper end of the connector tube 21 recedes from the ball 13 the ball moves by gravity towards and to its closed position, illustrated in Figure 1, thereby shutting off the vacuum from the tubular branch 12. The atmospheric pressure which enters the fitting by way of the branch 12 is then immediately effective to hold the ball 13 on its seat 7.

In the preferred system the stall cock of the present invention is mounted in an upright position, as illustrated in Figure 1, so that the port 6 extends vertically and the longitudinal axis of the bore 14 is at an angle of approximately 30° to the horizontal. When the connector tube 21 is outside of the stall cock the open end of the bore 14 faces downwardly and therefore dust and other foreign matter is less likely to gather on the interior of the bore. When the connector tube 21 with the hose 20 thereon is inserted into the bore 14 the gravitational pull of the hose 20 on the connector tube 21 is in a direction vertically downwardly and not in a direction axially of the connector tube 21. Because of the angle, with the vertical, of the bore 14 the vertically downward pull of the hose 20 on the connector tube 21 causes the connector tube 21 to tend to cock or turn about a horizontal axis in the bore 14. This tends to cause the connector tube 21 to bind in the bore 14 so that if the vacuum should be lost in the line 1 at the time of or after insertion of the connector tube in the bore 14, the connector tube would nevertheless remain in the bore, although it would not be pulled upwardly therein as in the case when there is a vacuum. This is of considerable importance in milking machine installations. After a connector tube 21 has been inserted into the stall cock and the milking action started something may go wrong temporarily with the vacuum line resulting in a loss of the vacuum in the line 1. This may be caused, for instance, by an attendant accidentally opening an adjacent stall cock on the line 1, with the result that atmospheric pressure momentarily prevails in the line 1. Even if such action takes place for a short while the connector tube 21 will not drop out of the bore 14. Therefore upon reestablishment of the vacuum in the line 1 the milking operation will continue.

If desired the connector tube 21 may be made a part of the fitting, rather than a part of the hose. This is illustrated in Figure 3 wherein the connector tube 21' differs from the connector tube 21 only in that a longitudinal slot 30 is formed in the upper wall of the connector tube. A pin 31 is driven through a hole in the fitting and rides in the slot 30. The pin 30 thus prevents downward withdrawal of the connector tube from the fitting. In the embodiment of the invention illustrated in Figure 3 when it is desired to connect a hose 20 to the vacuum line it is merely necessary to insert the hose over the lower end of the connector tube. In placing the hose onto the lower end of the connector tube the operator at the same time pushes the connector tube upwardly, thus unseating the ball 13 and establishing vacuum connections to the hose 20. When it is desired to disconnect the hose from the vacuum line it is merely necessary to exert a pull on the end of the hose. The first result of the pull is that the connector tube 21 is drawn to the position illustrated in Figure 3, thus permitting the ball 13 to close the port or bore 6. The upper end of the slot 30 in the connector tube engages the stationary pin 31 preventing further downward movement of the connector. Further downward pulling of the hose results in retraction of the hose from the connector tube 21'.

In compliance with the requirements of the patent statutes I have here shown and described a few preferred embodiments of my invention. It is, however, to be understood that the invention is not limited to the precise constructions here shown, the same being merely illustrative of the principles of the invention.

What is considered new and desired to be secured by Letters Patent is:

1. A device for establishing a plug-in type of severable connection between a vacuum pipe line and a portable hose, comprising a fitting one end of which is adapted to be connected to a vacuum line, said fitting having an open tubular portion constituting a part of the fitting, a hose connector tube slidable lengthwise in said tubular portion, a valve seat in said fitting between said one end and said connector tube, a movable closure for said valve seat, said closure being movable in the fitting to its open position by a movement in a direction parallel to the longitudinal axis of the open tubular portion and being movable in a direction towards pressure engagement with the seat and being exposed to atmospheric pressure on the surface thereof opposite the surface which is in engagement with the valve seat when in the valve closed position whereby it is pressed towards said seat by the atmospheric pressure, said closure being moved by said connector tube to its unseated position.

2. A device for establishing a plug-in type of severable connection between a vacuum pipe line and a portable hose, comprising a fitting one end of which is adapted to be connected to a vacuum line, said fitting having an open tubular portion constituting a part of the fitting, the longitudinal axis of the tubular portion being at an angle to the part of the fitting that connects to the line, a hose connector tube slidable lengthwise in said tubular portion, a flange on said connector tube adapted to engage the tubular portion and thereby limit the extent of movement of the connector tube inwardly of said fitting, a valve seat in said fitting between said one end and said connector tube, a movable closure for said valve seat, said closure being movable in the fitting in a direction towards pressure engagement with the seat and being exposed to atmospheric pressure on the surface thereof opposite the surface which is in engagement with the valve seat when in the valve closed position whereby it is pressed towards said seat by the atmospheric pressure, said closure being moved by said connector tube to its unseated position, said flange on the connector tube making an air tight fit around the end of the tubular portion of the fitting, the interior of the fitting being open to the vacuum pressure of the line when the closure is unseated whereby the preponderance of atmospheric pressure over the vacuum of the line maintains the connector tube in its inwardly moved valve unseating position.

3. A stall cock for establishing a plug in type of severable connection between the vacuum pipe line and a portable hose of a milking machine unit, comprising a fitting one end of which is adapted to be connected to a vacuum line, said fitting having an open tubular portion, a hose connector tube slidable in said tubular portion, an upwardly facing valve seat in said fitting between said one end and said connector tube, a movable ball seated on said valve seat and pressed towards said seat by the atmospheric pressure, said ball being in the path of movement of the connector tube and unseated by said tube and held thereby in its unseated position and returned by gravity to its seated position upon retraction of the connector tube, means limiting the extent of its insertion into the fitting and making an air tight fit between the tube and the end of the tubular portion of the fitting, the interior of the fitting being open to vacuum pressure of the line when the closure is unseated whereby the preponderance of atmospheric pressure over the vacuum pressure of the line maintains the connector tube in its inwardly moved valve unseating position.

4. A device for establishing a plug-in type of severable connection between the vacuum pipe line of a milking machine installation and a portable hose of a milking machine unit, comprising a hollow fitting which is adapted to be connected to a vacuum pipe line, said fitting having a tubular portion open to the atmosphere, an open ended connector tube one end of which is adapted to be connected to the portable hose of a milking machine installation and the opposite end of which is slidable in said tubular portion, and valve means controlled by the position of said connector tube in said tubular portion and normally closing communication between the vacuum line and the tubular portion and opening such communication as the connector tube is slid inwardly in the tubular portion, said connector tube having a peripheral flange adapted to engage and seal with the end of the tubuular portion whereby the atmospheric pressure holds the connector tube in its inwardly moved position in the tubular portion.

5. A gravity closed stall cock for connecting a vacuum pipe line of a milking machine installation with a portable hose of a milking machine unit, comprising a hollow fitting the lower end of which is adapted to be connected to a vacuum pipe line, a tubular branch extending downwardly from the upper end of said fitting at an agle to the vertical and open to the atmosphere at the bottom, an upwardly facing valve seat formed in said fitting below the top of said branch, a movable ball closure seated on said seat, and a connector tube one end of which is adapted to be connected to the end of the portable hose of a milking machine installation and the opposite end of which is slidable in said tubular branch to move said ball from its seat.

6. A device for connecting a vacuum pipe line of a milking machine installation with a portable hose of a milking machine unit, comprpising a hollow fitting the lower end of which is adapted to be connected to a vacuum pipe line, a tubular branch extending from the upper end of said fitting at an angle thereto and open to the atmosphere, an upwardly facing valve seat formed in said fitting below the top of said branch, a movable ball closure seated on said seat, and a connector tube one end of which is adapted to be connected to the end of the portable hose of a milking machine installation and the opposite end of which is slidable in said tubular branch to move said ball from its seat, said connector tube having a peripheral flange adapted to engage and seal with the end of the tubular branch whereby the atmospheric pressure holds the connector tube in its position maintaining the closure off of the seat.

7. A device for connecting the vacuum pipe line of a milking machine installation with a portable hose of a milking machine unit, comprising a hollow fitting adapted to be connected to a vacuum pipe line, said fitting having a tubular portion open to the atmosphere, a valve seat formed in said fitting between the part of the fitting that connects to the vacuum line and the tubular portion, a movable closure seated on said seat and biased to its seating position and maintained in said position by the preponderance of atmospheric pressure on one side over the vacuum on the other side, and a connector tube one end of which is adapted to be connected to the portable hose of a milking machine installation, said connector tube having a closure unseating member slidable in said tubuular portion into unseating engagement with the movable closure and said connector tube having a peripheral flange adapted to engage and seal with the end of the tubular portion whereby the atmospheric pressure holds the connector tube in its position maintaining the closure off of the seat.

8. A device for connecting a vacuum pipe line with a portable hose, comprising a fitting forming a part of the pipe line and having a port communicating with the interior of the pipe line, said port terminating in a valve seat, a ball inside of said fitting and resting on said seat and closing said port and held in its closed position by atmospheric pressure, said fitting having a connector receiving tube open to the atmosphere and in alignment with said ball, and a vacuum line connector adapted to receive the end of a portable hose for establishing vacuum connections between the hose and the pipe line by way of the fitting, said connector including a portion adapted to slide in said connector receiving tube and abut against and unseat said ball from said seat.

9. In a milking machine installation including a vacuum line and means for connecting the line to a portable hose of a milking machine unit, said means comprising a fitting connected to the line and having a tubular portion open to the atmosphere, a connector tube one end of which is adapted to be connected to the portable hose of a milking machine unit and the opposite end of which is slidable lengthwise in said tubular portion, said tubular portion extending downwardly to inhibit the entrance of foreign matter into the fitting and being open at the bottom and being at such an angle to the vertical that with the connector tube in operative position the downward pull on the tube due to the weight of a hose connected thereto causes it to bind with the tubular portion and thus remain in position, said connector tube being slidable to its inoperative position with respect to the tubular portion by pulling on the connector tube in the direction of its longitudinal axis, and valve means in the fitting and normally closing communication between the vacuum line and the tubular portion, at least a part of the valve means being located in the path of movement of the connector tube to its operative position and being moved by such movement of the connector tube to open the valve.

10. A stall cock for milking machine installations comprising a body having an open end adapted to be connected to a vacuum line and another end open to the atmosphere and adapted to receive a plug-in type of coupling for establishing vacuum connections to a portable milking machine unit, said body having an air passageway between the two ends and a valve in said passageway and controlling the air flow therethrough, the end of the body that opens to the atmosphere being straight so that a plug-in connector may be moved lengthwise thereinto and being downwardly inclined to prevent foreign matter from falling thereinto and at such an angle to the vertical that a vertically downward pull on a connector therein is ineffective to cause the connector to slide out of the body, the valve having a valve seat which faces the part of the passageway that leads to the end which is to remain open to the atmosphere so that the vacuum of a line helps to hold the valve closed, the valve including a closure member resting on and supported by said seat in its valve closed position and movable in a direction across the face of the seat to the open position by the longitudinal movement of a plug-in type connector into the end of the body that opens to the atmosphere.

11. A stall cock for connecting a portable hose of a vacuum milking installation to a vacuum pipe line, said stall cock comprising a fitting for mounting on the pipe line and having a port communicating with the interior thereof, said port terminating in an upwardly facing valve seat at the top thereof, a ball on said seat and closing said port and biased to its closed position by gravity, said fitting having integral therewith a straight connector-receiving tube communicating with said port through said valve, said connector-receiving tube extending downwardly from the valve seat and at an angle to said port and in alignment with said ball, said connector-receiving tube being open at its bottom for receiving a vacuum line connector that is slidable thereinto into unseating engagement with said ball.

12. A stall cock for connecting a portable hose of a vacuum milking installation to a vacuum pipe line, said stall cock comprising a fitting for mounting on the pipe line and having a port communicating with the interior thereof, said port terminating in an upwardly facing valve seat at the top thereof, a ball on said seat and closing said port and biased to its closed position by gravity, said fitting having integral therewith a straight connector-receiving tube communicating with said port through said valve, said connector-receiving tube extending downwardly from the valve seat and at an angle to said port and in alignment with said ball, said connector-receiving tube being open at its bottom for receiving a vacuum line connector that is slidable thereinto into unseating engagement with said ball, said fitting having an opening above the valve seat, and a removable closure for said opening, said closure being removable for gaining access to the valve seat for maintenance purposes.

13. A stall cock for mounting on a vacuum pipe line of a milking installation, said stall cock comprising a fitting having two communicating ports at an angle to one another, one of the ports opening at the end of the stall cock that is to be connected to the vacuum line, said one port terminating in a valve seat at the end thereof that connects with the other port, said valve seat facing into the other port, a movable valve closure on said seat, said other port being a straight tube constituting a part of the fitting and in alignment with the valve closure and extending downwardly therefrom and open at its bottom for receiving a slidable connector tube slidable thereinto into position unseating the valve closure.

EMANUEL RAWSON.

REFERENCES CITED

The following references are of record in the file of this patent:

UNITED STATES PATENTS

| Number | Name | Date |
| --- | --- | --- |
| 1,970,845 | Dodge | Aug. 21, 1934 |

FOREIGN PATENTS

| Number | Country | Date |
| --- | --- | --- |
| 313,551 | Italy | Dec. 29, 1933 |
| 367,984 | Germany | Mar. 2, 1922 |